MAGNETIC HEAD AND METHOD OF MAKING SAME

Filed Dec. 22, 1951 2 Sheets-Sheet 1

INVENTOR
F. G. BUHRENDORF
BY V. P. Priolo
ATTORNEY

April 27, 1954 F. G. BUHRENDORF 2,677,019

MAGNETIC HEAD AND METHOD OF MAKING SAME

Filed Dec. 22, 1951 2 Sheets-Sheet 2

INVENTOR
F. G. BUHRENDORF
BY V. P. Priolo
ATTORNEY

Patented Apr. 27, 1954

2,677,019

UNITED STATES PATENT OFFICE 2,677,019

MAGNETIC HEAD AND METHOD OF MAKING SAME

Frederick G. Buhrendorf, Westfield, N. J., assignor to Bell Telephone Laboratories, Incorporated, New York, N. Y., a corporation of New York Application December 22, 1951, Serial No. 262,950

11 Claims. (Cl. 179—100.2)

This invention relates to magnetic heads for use in magnetic recording and reproduction, and particularly to a magnetic head with a transformer built therein to form a single unitary structure.

The object of this invention is to provide a high frequency magnetic recording and reproducing head which is economical to manufacture and which is efficient in operation, particularly in the recording and reproduction of microsecond electrical pulses.

In accordance with this invention the above-noted requirements are satisfactorily met by a novel magnetic head which comprises a transformer core carrying two windings. The primary winding, which is to be connected to the associated equipment, consists of a convenient number of turns of insulated wire, such as enamel covered copper wire, the number of turns being defined by the associated equipment and the structural limitations of the core. The secondary winding is endless and consists of one or several turns terminated in a slender filament of conducting material flush with the surface of the outer edge of the core. Flux surrounding this filament, when current is induced in it, is used to record on the magnetic medium in much the same manner as in conventional air-gap type heads. In reproduction, current induced in this filament generates a flux in the core and, by virtue of the transformer action, a voltage is delivered to the associated equipment by the larger primary winding.

An important feature of this invention resides in the structure of the secondary winding which may be applied directly to the surface of the core if said core is made of a reasonably non-conductive material such as ferrite.

The nature of the invention and its distinguishing features and advantages will be more clearly understod from the following detailed description and the accompanying drawings in which.

Figures 1, 2, 3, 4, 5:
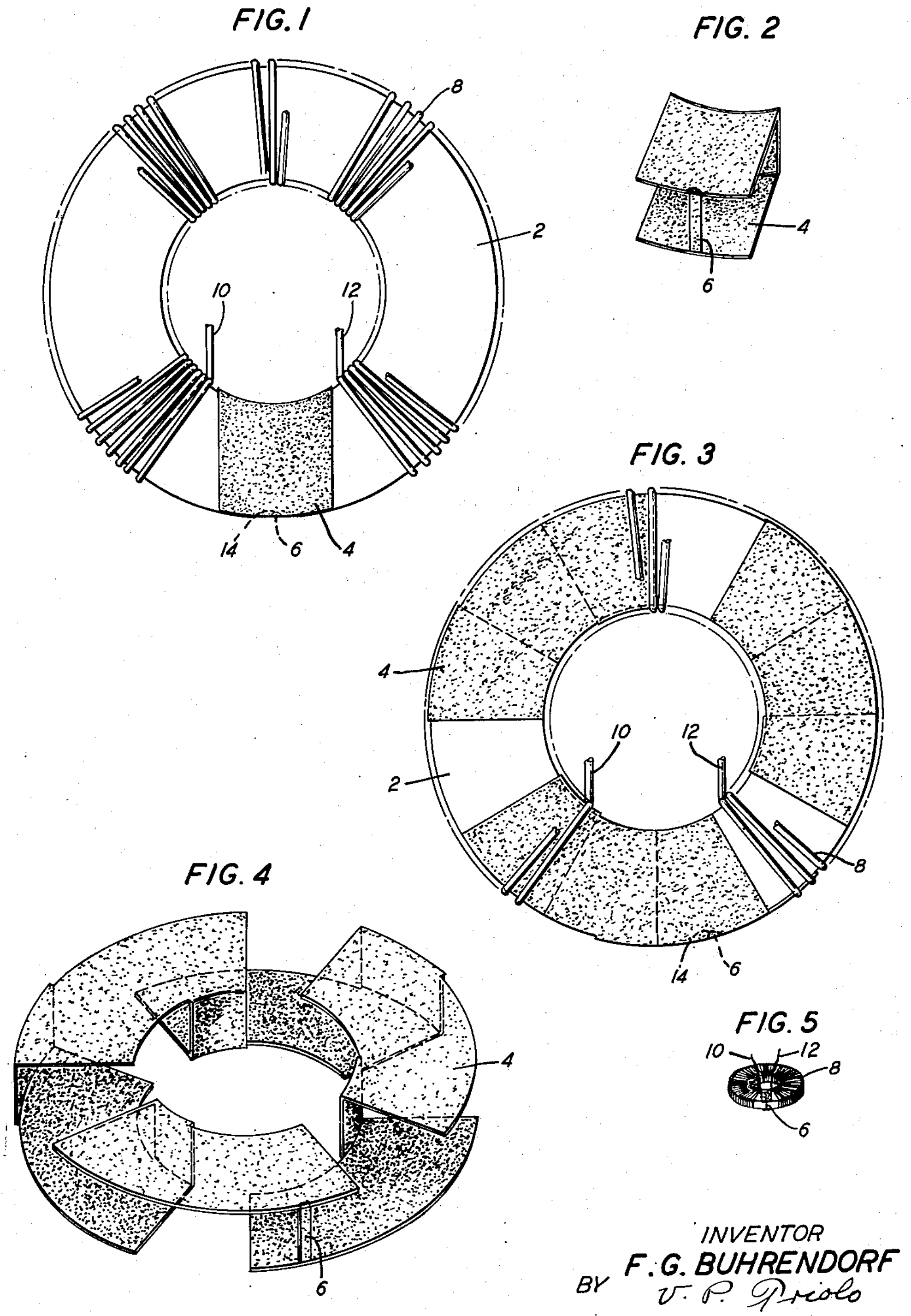
Fig. 1 is a plan view of an embodiment of the present invention in which the transformer core is toroidal and the secondary winding is a single turn.
Fig. 2 is a view in perspective of the secondary winding shown in Fig. 1.
Fig. 3 is a plan view of an embodiment of the present invention in which the transformer core is toroidal and the secondary winding consists of a plurality of turns.
Fig. 4 is a view in perspective of the secondary winding shown in Fig. 3.
Fig. 5 is a view in perspective showing the actual dimensions of a magnetic head in accordance with the present invention.

Referring now to the accompanying drawings 2 is the core of the magnetic head and is preferably made of a high permeability, low loss, magnetic material such as ferrite. The endless secondary winding 4 consists of one turn as shown in Figs. 1, 2, 6, 8 and 10 or a plurality of turns as shown in Figs. 3 and 4 of a low resistance material such as copper or silver, and is terminated in a slender filament of low resistance, conducting material 6 which is flush with the surface of the outer edge or rim of the core. It is to be understood that an endless secondary winding consisting of a plurality of turns may also be employed with each of the transformer cores shown in Figs. 6, 8 and 10. The primary winding 8 comprises a plurality of turns of insulated low resistance wire, such as enamel covered copper wire, wound in such manner as to be coupled closely to the core and/or the secondary winding. The number of turns in this winding is defined by the associated equipment to which it is to be connected by means of the terminal wires 10 and 12, and the structural limitations of the core.

While satisfactory results may be obtained with heads in accordance with the present invention in which the filament lies at an angle with respect to the axis of the core, it has been found that for convenience in manufacture and simplicity in mounting the filament should be located parallel to the axis of the core as shown in each of the embodiments of the present invention.

For optimum results the filament should lie in a plane parallel to the surface of the record medium and normal to the direction of the relative motion of the recording head with respect to the record medium.

Figure 6:
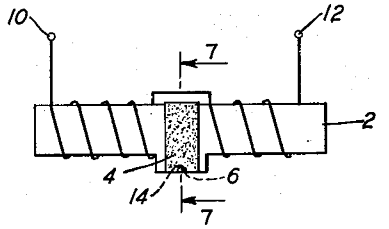
Fig. 6 is a plan view of an embodiment of the present invention in which the transformer core is a bar element.
Figure 7:
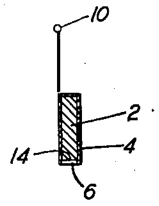
Fig. 7 is a sectional view taken on the line 7—7 of Fig. 6.
Figure 8:
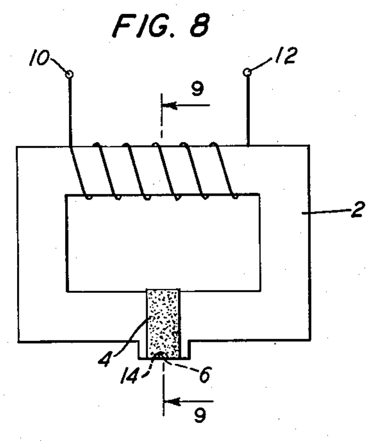
Fig. 8 is a plan view of an embodiment of the present invention in which the transformer core is rectangular.
Figure 9:
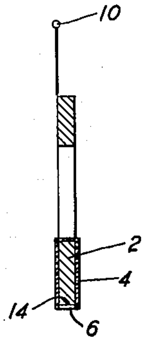
Fig. 9 is a sectional view taken on the line 9—9 of Fig. 8.
Figure 10:
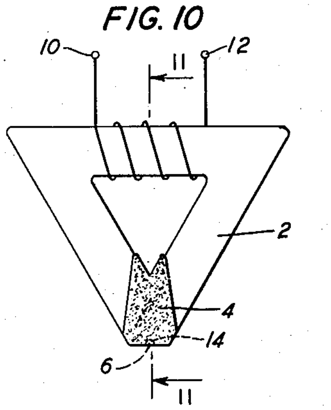
Fig. 10 is a plan view of an embodiment of the present invention in which the transformer core is triangular.
Figure 11:
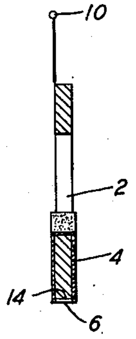
Fig. 11 is a sectional view taken on the line 11—11 of Fig. 10.

The particular embodiments of this invention as shown in Figs. 1 to 11 are intended for use with a right circular cylindrical record medium revolving about its axis. The recording head is placed so that the filament clears the surface of the cylinder by 0.002 inch and the axis of the core of each of the embodiments, except the one shown in Figs. 6 and 7, is parallel to the axis of the cylinder. The axis of the core of the embodiment shown in Figs. 6 and 7 is normal to the axis of the cylinder.

In the preparation of the magnetic head, the secondary winding may be applied directly to the surface of the core 2. It has been found that the following procedure will provide a satisfactory secondary winding. A fine groove 14 substantially 0.003 inch deep and 0.002 inch wide and substantially parallel to the axis of the head is cut in the edge of the core. The entire core is then coated, by means of a process such as the Brashears silvering process, with a thin coating of metallic silver and given an electrodeposited copper flash. The entire core will have, at this point of the process, a copper coating approximately 0.0001 inch thick. The core is then masked with a stop-off lacquer, such as nitrocellulose lacquer, to form an electrical path around the core such as the single turn path shown in Fig. 2 or the path consisting of a plurality of turns shown in Fig. 4. A copper or silver plating 0.003 inch thick is then applied to the core. After the plating operation the lacquer is removed with a suitable solvent, such as acetone, and the entire core is etched until the surfaces previously masked are free of applied metal. The final operation is to lap off the surplus metal on either side of the groove 14, which is completely filled with copper, or silver, so that only a slender filament 6 will remain to complete the winding at that point.

The filament 6 should be flush with the surface of the outer edge of the core. It should not be underflush and should not extend beyond the outer edge of the core. The width of the filament should be as narrow as practicable. Widening of the filament widens the recorded spot or area on the record medium and also reduces the efficiency of the recording head.

The present invention eliminates the high concentration of flux which occurs at the pole tips in magnetic heads having conventional air-gaps and, therefore, permits the use of ferrite or other similar materials which, although saturating easily, have other characteristics which are most desirable for the recording and reproduction of high frequencies. For example, ferrite has extremely high resistivity and as a result the eddy currents in the present invention are very low. This important feature is desirable for efficient operation in the recording and reproduction of microsecond electrical pulses.

It has been found that the embodiment of the present invention in which the secondary winding is a single turn, as shown in Figs. 1, 2, 6, 8 and 10, will provide satisfactory results, particularly at the higher frequencies. The embodiment of the present invention in which the secondary winding consists of a plurality of turns and the primary is wound directly over the secondary, as shown in Figs. 3 and 4, may be used to greater advantage in those applications where closer coupling between the primary and secondary windings may be desirable.

The conductor of the secondary winding of each of the embodiments of the present invention should have as large a cross-section as possible, the area of said cross-section being limited only by the distributed capacity in a turn of the winding. It has been found that the optimum average width of the conductor of the secondary winding is equal to substantially one-tenth the average length of the magnetic path in the core.

It is to be understood that the above-described arrangements are illustrative of the application of the principles of the invention. Other arrangements may be devised by those skilled in the art without departing from the spirit and scope of the invention.

What is claimed is:

1. An electromagnetic transducer comprising a transformer core, a first winding on said core, said winding being endless, and a second winding wound over said first winding, said first winding including a segment disposed on said core in such manner as to be flush with the surface of the outer edge of said core.

2. A magnetic recording-reproducing head comprising a toroid core, an endless winding consisting of a plurality of turns on said core, and a toroid coil wound on said core, said endless winding including a filamentary segment disposed on said core in such manner as to be flush with the surface of the outer edge of said core.

3. A magnetic recording-reproducing head comprising a toroid core, an endless single turn winding on said core, and a toroid coil wound on said core, said endless winding including a filamentary segment disposed on said core in such manner as to be flush with the surface of the outer edge and parallel with the axis of said core.

4. A magnetic recording-reproducing head comprising a toroid core, an endless winding consisting of a plurality of turns on said core, and a toroid coil wound on said core, said endless winding including a filamentary segment disposed on said core in such manner as to be flush with the surface of the outer edge and parallel with the axis of said core.

5. An electromagnetic transducer head comprising a toroid core, an endless winding consisting of a plurality of turns on said core, and a toroid coil wound over said endless winding, said endless winding including a segment disposed on said core in such manner as to be flush with the surface of the outer edge of said core.

6. An electromagnetic transducer comprising a core of substantially nonconductive magnetic material, a first winding on said core, said winding being endless, and a second winding on said core, said first winding consisting of an adherent metallic coating deposited directly on said core, said coating being deposited on a portion of the outer edge of said core in such manner as to provide a filamentary conductor flush with the surface of said outer edge.

7. An electromagnetic transducer comprising a transformer core, a groove in the outer peripheral face of said core, a first winding on said core, said winding being endless and including a segment disposed in said groove, and a second winding wound over said first winding.

8. A magnetic recording-reproducing head comprising a toroid core, a groove in the outer peripheral face of said core, an endless winding on said core, said winding including a segment disposed in said groove, and a toroid coil wound over said endless winding.

9. An electromagnetic transducer comprising a core of substantially nonconductive magnetic material, a groove in the outer peripheral face of said core, a first winding on said core, a second winding on said core, said first winding being endless and consisting of an adherent metallic coating deposited directly on said core, said coating being deposited in said groove in such manner as to provide a segment of said first winding.

10. An electromagnetic transducer comprising a toroid core of substantially nonconductive magnetic material, a groove in the outer peripheral face of said core, said groove being parallel with the axis of said core, an endless winding on said core, a toroid coil wound on said core, said endless winding consisting of an adherent metallic coating deposited directly on said core, said coating being deposited in said groove in such manner as to provide a segment of said endless winding.

11. An electromagnetic transducer comprising a ferrite core, a groove in the outer peripheral face of said core, an endless winding on said core, a coil wound over said endless winding, said endless winding consisting of an adherent metallic coating deposited directly on said core, said coating being deposited in said groove in such manner as to provide a segment of said endless winding.

References Cited in the file of this patent

UNITED STATES PATENTS

| Number | Name | Date |
|---|---|---|
| 1,828,189 | Kiliani | Oct. 20, 1931 |
| 1,828,260 | Stille | Oct. 20, 1931 |
| 2,020,211 | Quam | Nov. 5, 1935 |
| 2,020,212 | Quam | Nov. 5, 1935 |
| 2,585,065 | Wiegand | Feb. 12, 1952 |